Dec. 5, 1961  J. C. MATHESON  3,011,242
MOLD FORM CLAMP
Filed March 9, 1960  2 Sheets-Sheet 1

JAMES C. MATHESON
INVENTOR
HUEBNER & WORREL
ATTORNEYS
BY

Dec. 5, 1961 J. C. MATHESON 3,011,242
MOLD FORM CLAMP
Filed March 9, 1960 2 Sheets-Sheet 2

JAMES C. MATHESON
INVENTOR
HUEBNER & WORREL
ATTORNEYS
BY
Richard M. Worrel 3,011,242
MOLD FORM CLAMP
James C. Matheson, 4666 E. Princeton, Fresno, Calif.
Filed Mar. 9, 1960, Ser. No. 13,817
10 Claims. (Cl. 25—131)

The present invention relates to an improved mold form clamp and more particularly to such a clamp which dependably holds mold form assemblies in position while the mold material is deposited and hardens therein.

The problems overcome by the present invention are best illustrated by reference to conventional mold forms and clamps therefor utilized in confining concrete while it hardens. Generally an elongated, rigid tie rod is extended across the mold cavity and through form walls, studs, and whalers constituting form assemblies on both sides of the mold cavity. Usually the opposite ends of this rod are screw-threaded for receiving nuts threadably tightened against the adjacent whalers to hold the form in assembled relation. The threaded rod and nuts satisfactorily perform their intended functions but are relatively expensive to construct and time-consuming to employ because of the described threading.

After the mold material has been poured and is hardened, the form assemblies are removed from the hardened material by unthreading the nuts. In the past, provision has been made for entirely removing the tie rods from the mold material or for leaving a portion embedded in the material in a concealed manner. The prior known clamps have been generally unsatisfactory in this regard in being difficult or time-consuming to operate, or too expensive to be abandoned in the mold material.

Accordingly, it is an object of the present invention to provide a clamp for a mold form which is easy to install and remove, and which dependably holds the form assemblies in position during depositing and hardening of the mold material.

Another object is to provide a durable but expendable tie member for a form clamp which can be left in the hardened mold material in a concealed manner and while occupying a minimum of space in the material.

Another object is to provide a form clamp for use with various types of forms including those having either one or two form walls.

These, together with other objects, will become more fully apparent upon reference to the following description and accompanying drawings.

Figure 1:
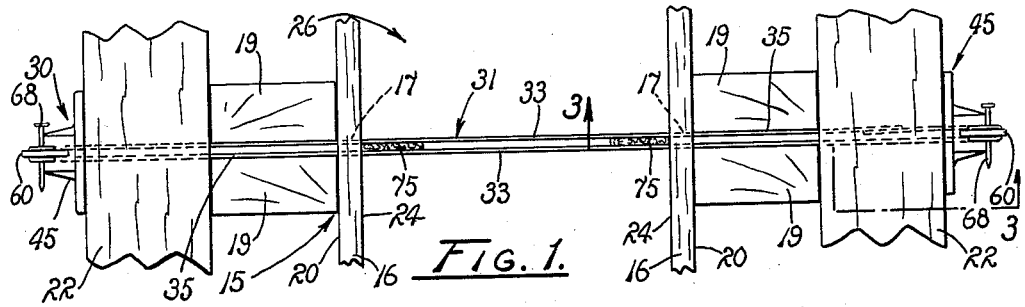
FIG. 1 is a fragmentary plan view of a mold form employing a clamp embodying the principles of the present invention.
Figure 2:
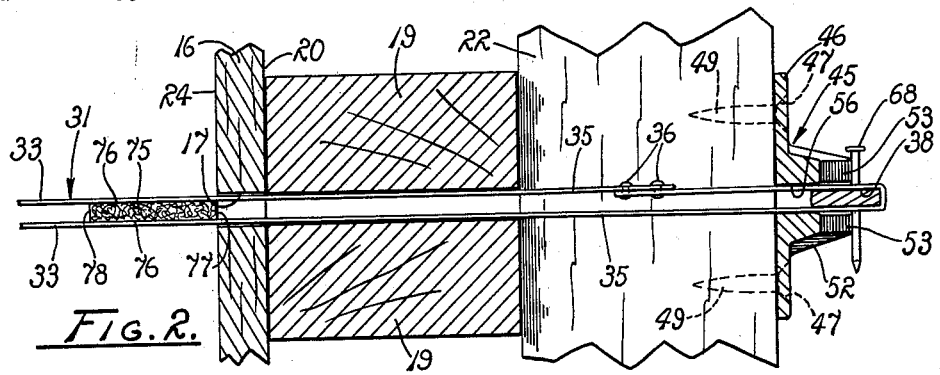
FIG. 2 is a somewhat enlarged, fragmentary horizontal section of the form and clamp of FIG. 1.

Referring more particularly to the drawings, a form is generally indicated by the numeral 15 in FIGS. 1 through 4. The form includes a pair of elongated, upright, form walls 16 adapted to rest on the ground, not shown, and including a pair of aligned apertures 17. The form also provides pairs of adjacent spaced studs 19 against the outer surfaces 20 of the walls and extended upwardly in substantially vertical positions. Elongated, horizontal whaler members 22 are extended transversely of the studs in outwardly spaced relation from the form walls. Each wall and its associated studs and whaler members constitute a form assembly. The form walls are in opposed, substantially parallel, spaced relation with their inside surfaces 24 defining a mold cavity 26 therebetween.

The form walls 16 are held in predetermined maximum spaced relation by means of a form clamp 30 embodying the principles of the present invention. The subject clamp includes an elongated, looped, endless tie member 31 of flat, narrow, shearable, flexible, substantially non-extensible, banding material, such as steel strip ¾ of an inch wide by 0.035 inch thick. The tie member has a pair of spaced intermediate or inner longitudinal portions 33, and pairs of outer longitudinal end portions 35 which are transversely interconnected at the extreme ends of the tie member. The tie member is conveniently made of a strip of the described material which is bent into the described shape and the overlapped ends interconnected by means of rivets 36, or any other suitable means. It is evident that the described end portions of the tie member provide openings, indicated at 38.

The tie member 31 is extended transversely of the form 15 with the intermediate portions 33 extended across the cavity 26, and with the outer end portions 35 individually extended through the apertures 17 in the form walls 16 and between the respectively adjacent studs 19 and whaler members 22. The outer end portions of the tie member protrude outwardly of the respective whaler members and expose the openings 38.

A pair of wedge blocks 45 is also included in the subject clamp 30, each providing a rectangular base or back plate 46 preferably having four countersunk holes 47 individually in the corners of the plate. Each plate is positioned against the whaler members 22 respectively adjacent to the opposite end portions 35 of the tie member 31. Screws 49 are individually extended through the holes in the plates and are screw-threaded into the whaler members thereby securely to mount the plates on the whaler members.

Figure 3:
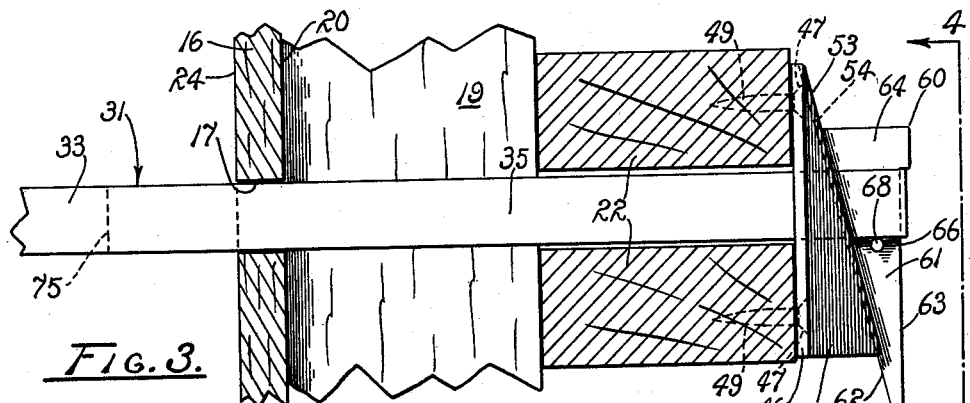
FIG. 3 is a somewhat enlarged, fragmentary vertical section taken on line 3—3 in FIG. 1.
Figure 4:
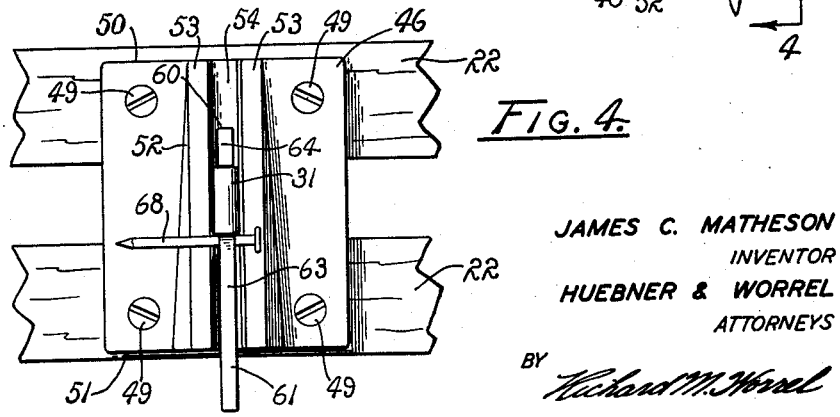
FIG. 4 is a fragmentary side elevation as viewed from a position indicated by line 4—4 in FIG. 3.

Each wedge block 45 also has an upper edge 50, a lower edge 51, and opposite side edges interconnecting the upper and lower edges. A triangular channel portion 52 includes a pair of spaced flanges 53 protruding outwardly from the plate in parallel relation to the side edges thereof and a wedging surface 54 therebetween. The wedging surface is in acute angular relation to the base plate, as illustrated in FIG. 3, so that the wedging surface and the base plate are downwardly divergently extended with respect to each other. The base plate and channel portion provide an elongated passageway 56 opening between the flanges and through the wedging surface and registering with the space between the whaler members 22 with the plates connected thereto. Further, the end portions 35 of the tie member are individually extended through the passageways in their respectively adjacent wedge blocks 45 thereby to expose the openings 38 in the tie member outwardly of the channel portion 52.

Substantially T-shaped triangular wedges 60 include legs 61 individually extended through the openings 38 in the tie member 31. The legs have inner wedging edges 62 in slidable engagement with the wedging surfaces 54 of their respectively adjacent channel portions 52, outer edges 63 in slidable engagement with the transverse ends of the tie member and substantially parallel to their respective base plates, and enlarged heads 64 engageable with the transverse ends of the tie member to limit downward sliding movement of the wedges with respect to the tie member. The wedges and channel portions have similar triangular configurations so that the same acute angular relation exists between the inner and outer edges of each wedge as between the base plate and wedging surface of each block. The legs also have holes 66 in longitudinally spaced relation therealong from their respective heads. With the wedges fully inserted into the openings of the tie member, the holes are on the opposite side of the tie member from the head and thus permit reception of nails 68 to preclude upward removal and dislodgement of the wedges from the tie member.

The subject clamp 30 also includes pairs of spacers 75 of compressible material, such as felt, having opposite surfaces 76 one or both of which is bonded, as by cementing, to the longitudinal intermediate portions 33 of the tie member 31, between said intermediate portions and respectively in juxtaposition to the form walls 16 when the tie member is connected to the form in the described manner. That is, the spacers have outer ends 77 terminating approximately in the plane of the inner surfaces 24 of the form walls and inner ends 78 inwardly spaced from said inner surfaces with respect to the mold cavity 26. While not intended to limit the invention, it is to be noted that the spacers extend from the form walls inwardly of the mold cavity at least about two inches in commercial forms of the subject invention wherein the transverse distance between the form walls is greater than eighteen inches. Where the walls are spaced closer than eighteen inches, it is preferable to provide a continuous spacer completely filling the space between the intermediate portions 33 and terminating adjacent to the respective inside surfaces of the form walls. Also, the spacers may protrude outwardly between the outer end portions 35 slightly although this is not required. In commercial embodiments of the subject invention, it has been found that strips of felt one-quarter of an inch thick by one inch wide by three inches long are excellently suited for the described purpose.

Operation

The operation of the described embodiment of the subject invention is believed to be readily apparent, as briefly summarized at this point.

Figure 5:
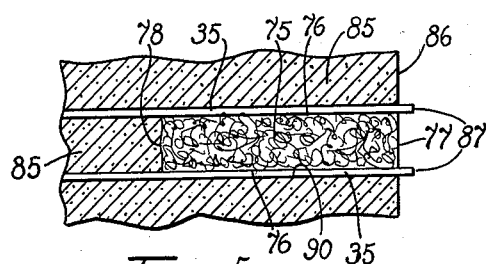
FIG. 5 is a fragmentary, vertical section of hardened moldable material molded in a form of the type shown in FIG. 1 and including a portion of the clamp embedded in the material.

With the form walls 16 held in predetermined limited spaced relation by means of a series of clamps 30, each as illustrated and described, but spaced longitudinally along the form, moldable material 85 is poured into the cavity 26 between the inside surfaces 24 of the form walls. The material flows throughout the cavity and thus around the intermediate portions 33 of the tie member 31. As illustrated in FIG. 5, the flowable material fills the space between the intermediate portions 33 except for that occupied by the spacers 75.

Figure 6:
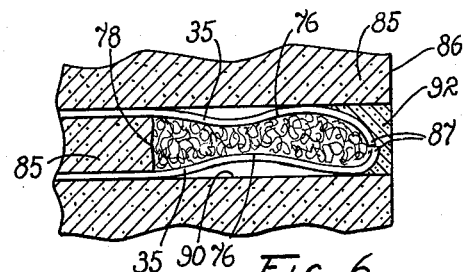
FIG. 6 is a view similar to FIG. 5 but showing the embedded portions of the clamp fully inserted within the material.

After the material 85 has hardened, the wedges 60 are removed from the openings 38 to permit movement of the whaler members 22 and studs 19 outwardly away from the form walls 16, and to permit stripping of the form walls away from the opposite outside surfaces 86 of the hardened molded material. In this condition, the outer end portions 35 of the tie members 31 protrude outwardly on opposite sides of the hardened material along the length thereof. These opposite end portions are then cut in closely adjacent relation to the opposite surfaces of the material to leave short free ends 87, as illustrated in FIG. 5. The free ends of the tie members are then forcibly inserted into the pockets 90 provided in the hardened material by the spacers 75 and the parts of the intermediate portions 33 connected to the spacers, as illustrated in FIG. 6. Because the spacers are of compressible material, the free ends of the tie members are readily bent or curled, as by hammering, into the pockets around the spacers.

After the free ends 87 of the tie members 31 have been completely inserted into the pockets 90 and are located inwardly of the outside surfaces 86 of the hardened material 85, the unoccupied outer spaces of the pockets are filled with mortar, as indicated at 92, and the mortar smoothed flush with the outside surfaces of the hardened material. It is thus evident that the tie members are completely concealed within the body of the hardened material and the outside surfaces are smooth and uniform in appearance.

Modified tie member

Figure 7:
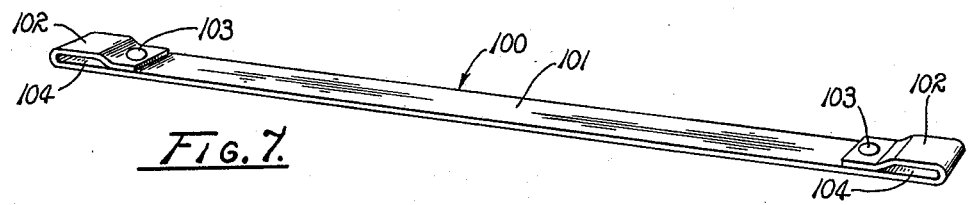
FIG. 7 is a fragmentary perspective view of a modified tie member employed in the clamp of the subject invention.

A modified tie member is indicated by the numeral 100 in FIG. 7 and is adapted for use with the form 15. The tie member 100 includes an elongated intermediate portion 101 and opposite looped end portions 102 reversely turned on the intermediate portion and secured thereto by means of rivets 103. These end portions provide openings 104.

The modified tie member 100 is constructed of the same material as the tie member 31 and thus has the same characteristics insofar as the material is concerned. This tie member is used in a manner similar to the tie member 31 in holding the form walls 16 of a form 15 in assembled relation. The looped end portions 104 extend through the passageways 56 and the openings 104 slidably receive the wedges 16 in the same manner as described above with tie member 31. After the moldable material has set, with the tie member 100, the intermediate portion 101 is clipped substantially flush with the outside surfaces of the material. Spacers, as 75, may be attached to the intermediate portion, as before to provide pockets for the clipped ends of the intermediate portion; in this event, the looped end portions 102 are preferably inwardly extended toward each other to circumscribe and cover the spacers.

Modified wedge block

Figures 8, 9:
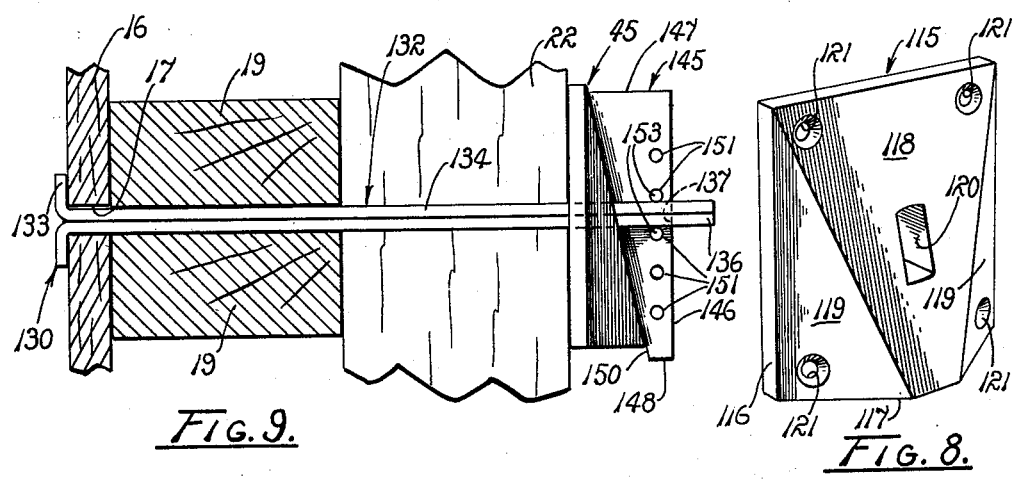
FIG. 8 is a perspective view of a modified wedge block employed in the clamp of the present invention.
FIG. 9 is a fragmentary vertical section similar to FIG. 3 but showing a modified clamp embodying the principles of the present invention.

A modified wedge block is indicated by the numeral 115 in FIG. 8. This block is used alternatively with the wedge block 45 and includes a base plate 116, a lower end surface 117 substantially normal to the base plate, a wedging surface 118 downwardly acutely, angularly extended with respect to the base plate, and opposite side surfaces 119 upwardly convergently extended from and in acute angular relation to the base plate toward the wedging surface. Thus the block has a substantially trapezoidal cross-section in a plane passing transversely through the wedging surface and normal to the base plate. The wedge block 115 also has a passageway 120 adapted to receive the opposite end portions 35, or 102, of the tie members 31, or 100 and is provided with screw-receiving holes. It is believed evident that the wedge block 115 is used in the same manner as the block 45 and thus enables tensioning of the tie member incident to slidable wedging engagement of the wedging edge 62 of the wedge 60 against the wedging surface 118.

Modified clamp

A modified clamp is generally indicated by the numeral 130 in FIG. 9 for use with half of the form 15 of FIG. 1. Thus, in FIG. 9, only one of the form walls 16 is shown along with its associated studs 19 and whaler members 22. This clamp includes an elongated T-shaped tie member 132 having a base portion 133 adapted to fit against the inside surface 24 of one of the form walls and an elongated leg 134 integral with the base portion and extended outwardly therefrom through the aperture 17 in the form wall, between the studs and whaler members, and outwardly from the whaler members thereby exposing an end portion 136 of the leg providing an opening 137, best seen in FIG. 10. Actually, the tie member is preferably constructed of a pair of L-shaped portions secured, as by welding, in back-to-back relation.

A wedge block 45 is secured to the whaler members 22, as before, with the end portion 136 of the tie member 132 extended outwardly through the passageway 56 in the block. Alternatively, it is to be noted that the wedge block 115, as described above, may be employed.

A modified wedge 145 is illustrated in association with the modified clamp 130 and is of substantially trapezoidal shape. This wedge has an outer edge 146 substantially perpendicularly related to upper and lower end edges 147 and 148, respectively, and an inner wedging edge 150 convergently downwardly extended from the upper end edge to the lower end edge with respect to the outer edge. The wedge 145 has a plurality of holes 151 in adjacent longitudinally spaced relation along the outer edge. The wedge 145 is extended through the opening 137 in the tie member 132 with the edge 150 against the wedging surface 154 of the block 145 and with the outer edge 146 against the outer end 136 of the tie member 132. By driving the wedge downwardly, the form wall 16, the studs 19, and the whaler members 22 are tightly held in assembled relation between the base portion 133 of the tie member and the wedging block 45. When the desired compressed relationship is achieved, nails 153 are extended through the holes 151 above and below the tie member thereby dependably to hold the wedge in desired position transversely of the tie member.

*Further modification of clamp*

Figures 10, 11:
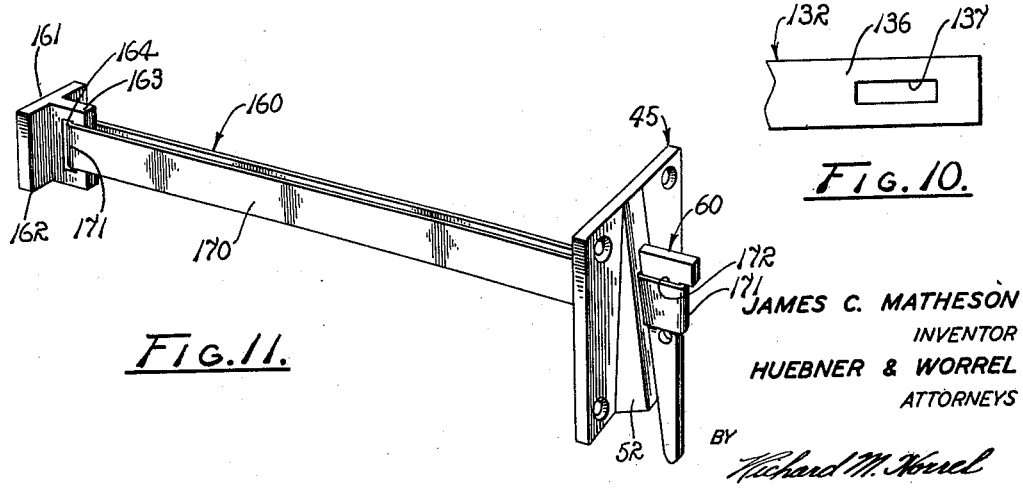
FIG. 10 is a fragmentary end portion of the tie member of the form of clamp shown in FIG. 9.
FIG. 11 is a perspective view of a further modification of a clamp embodying the present invention.

Still another modified clamp is illustrated in FIG. 11 for use with the partial form 15 shown in FIG. 9. This clamp includes a T-shaped tie member 160 having a separate base portion 161. The base portion includes a flange 162 and a web 163 integrally perpendicularly extended from the flange and providing a slot 164.

An elongated, looped leg 170, of the same construction and material as the tie member 31, is threaded through the slot 164 and thereby connected to the base portion. This leg has an extended end portion 171 providing an opening 172.

In use of this modification of the clamp, reference is made to the portion of the form illustrated in FIG. 9. This clamp is employed as a substitute for the modified clamp 130. Thus, the leg 170 of the tie member 160 is extended through aperture 17 in the wall 16, and between the studs 19 and whaler members 22 so that the end 171 of the leg extends outwardly from the whaler members. Either of the wedge blocks 45 or 115 are employed, as before, and by using either the wedge 60 or 145, the form wall, the studs, and whalers are compressively held in assembled relation between the flange 162 of the base portion 161 and the slidably associated wedge block and wedge.

From the foregoing, it is evident that a clamp for a mold form has been provided which obviates several disadvantages of the prior art clamps. The clamp is of economical construction, is adapted for forms of various sizes, is easy to install and remove, and dependably holds the parts of the form in assembled relation during pouring and hardening of the moldable material. In the preferred form of the invention, portions of the tie member remain embedded in the moldable material, as hardened, so as to be concealed from view externally of the material. It has been found in practical applications of the subject clamp that its use results in savings in time, labor, and money in the molding of materials.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A clamp for a mold form including a form wall having an inner surface against which hardenable material is received comprising an elongated tie member of flat banding material having an extended end providing a loop circumscribing an opening therein, the tie member being adapted to extend through such a form transversely of the wall with the opening in said end spaced outwardly from the wall on the opposite side thereof from its inner surface; a wedge block longitudinally slidably receiving the end of the tie member therethrough having an inner edge adapted to abut the form between the wall and said end opening and an outer edge; and a wedge extended through said opening having an outer edge in slidable flush engagement with the end of the tie member and an inner edge in slidable wedging engagement with the outer edge of the block, the engaging inner and outer edges of the wedge and wedge block being complementary to each other and acutely angularly related to the outer edge of the wedge.

2. In a mold form including a form wall having inner and outer surfaces and spacing means positioned against the outer surface of the wall, a form clamp comprising a wedge block adapted to be secured to the spacing means on the opposite side thereof from the wall; a tie member of flat, flexible banding material extended transversely through the spacing means having an inner end portion adapted to extend through and be positioned on the opposite side of the wall from the spacing means and an outer end extended outwardly through the block and providing a loop circumscribing an enclosed opening on the opposite side of the block from the wall and the spacing means; means connected to the inner end of the tie member resisting movement thereof toward the block; and a wedge releasably extended through said opening in slidable wedging engagement with the block and the outer end of the tie member thereby to maintain the block and the wall in predetermined minimum spaced relation to each other, wherein the wedge block includes a substantially flat base plate and a wedging surface in acute angular relation to the plate, the passageway in the block extending through the wedging surface, and wherein the wedge includes an outer edge in complementary, flush engagement with the outer end portion of the tie member and substantially parallel to the plate when the wedge is fitted in said opening, and a wedging edge acutely angularly related to said outer edge and complementarily engaging the wedging surface of the block.

3. The clamp of claim 2 wherein the wedge block has a pair of transversely spaced flanges substantially perpendicularly outwardly extended from the plate on opposite sides of said wedging surface and whereby the flanges and the wedging surface define a channel for slidably receiving the wedge therein.

4. The clamp of claim 2 wherein the wedge block has an end surface substantially normal to the base plate and acutely angularly related to the wedging surface, and side surfaces on opposite sides of the wedging surface in acute angular relation to the base plate whereby the block has a substantially trapezoidal cross-section in a plane passing transversely through the wedging surface.

5. The clamp of claim 2 wherein the wedge is substantially T-shaped and includes a leg releasably received in the opening of the tie member and a head larger than the leg engaging the tie member for limiting movement of the wedge through the opening during wedging engagement between the block and said outer end portion of the tie member.

6. The clamp of claim 2 wherein the wedge is substantially trapezoidal shaped and has a plurality of holes therein spaced longitudinally of each other along said outer edge, and wherein fastening means are releasably extended through holes on opposite sides of the tie member for limiting movement of the wedge through the opening in the tie member.

7. A clamp for mold forms having a pair of form assemblies including form walls in opposed spaced relation to each other to provide a mold cavity therebetween comprising an elongated tie member having opposite ends, the tie member being an elongated loop of banding material having closely spaced, opposed, longitudinal portions interconnected at said opposite ends of the tie member, said tie member being adapted to extend transversely of the cavity through each of the wall assemblies, the opposite ends of the tie member being adapted to be extended outwardly from the respective assemblies, each of said ends having openings therein between said longitudinal portions; wedge blocks individually, longitudinally slidably receiving the ends of the tie member therethrough and adapted to abut their respectively adjacent form assemblies, the blocks having outer wedging surfaces obliquely angularly related to the tie member; and wedges individually extended through said openings between said longitudinal portions, having outer surfaces parallel to and in slidable flush engagement with the ends of the tie member, and having inner surfaces in complementary slidable wedging engagement with the outer edges of the blocks at their respective ends of the tie member.

8. The clamp of claim 7 wherein the banding material is flexible, and wherein compressible spacing means is interposed the longitudinal portions and is adapted to be positioned adjacent to said form walls whereby the longitudinal portions are held in spaced relation to each other adjacent to said walls when moldable material fills the cavity around the tie member.

9. In a mold form including a form wall having an inner surface against which moldable material is placed for hardening and an opposite outer surface, a clamp comprising an elongated tie member of flat, bendable, shearable, banding material extended through the form wall and having inner and outer portions on opposite sides of the wall respectively adjacent to said inner and outer surfaces, said inner portion being embeddable in moldable material against the form wall; means releasably connected to the outer portion of the tie member in engagement with the form to tension the tie member and hold the wall in predetermined relation to the tie member; and a compressible spacer borne by the inner portion of the tie member in juxtaposition to the form wall, also embeddable in the moldable material, for holding the moldable material in spaced relation to the tie member adjacent to the wall so that after the material is hardened and the form is removed therefrom, the tie member is sheared adjacent to the hardened material and the remaining free end is bendably forced into the space provided between the material and the tie member by the spacer, said spacer compressing to accommodate entry of such end.

10. The clamp of claim 1 including a base portion having a flange adapted to engage the inner surface of such a form wall and a web outwardly extended from the flange and providing a slot therein, wherein the tie member has an opposite end providing a loop receiving the web of the base portion with said opposite end extended through the slot.

References Cited in the file of this patent
UNITED STATES PATENTS

| | | |
|---|---|---|
| 1,612,401 | Townsend | Dec. 28, 1926 |
| 2,329,550 | Mentesana et al. | Sept. 14, 1943 |
| 2,433,934 | Symons | Jan. 6, 1948 |
| 2,539,703 | Sato | Jan. 30, 1951 |